ns010161265B2

(12) United States Patent
Isayama et al.

(10) Patent No.: US 10,161,265 B2
(45) Date of Patent: Dec. 25, 2018

(54) BEARING DEVICE FOR TURBOCHARGER, AND TURBOCHARGER

(71) Applicant: MITSUBISHI HEAVY INDUSTRIES ENGINE & TURBOCHARGER, LTD., Sagamihara-shi, Kanagawa (JP)

(72) Inventors: Shuichi Isayama, Tokyo (JP); Takashi Nambu, Tokyo (JP); Takaya Futae, Tokyo (JP); Yuya Kojima, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/546,819

(22) PCT Filed: Sep. 10, 2015

(86) PCT No.: PCT/JP2015/075683
§ 371 (c)(1),
(2) Date: Jul. 27, 2017

(87) PCT Pub. No.: WO2017/042925
PCT Pub. Date: Mar. 16, 2017

(65) Prior Publication Data
US 2018/0003081 A1 Jan. 4, 2018

(51) Int. Cl.
*F16C 17/00* (2006.01)
*F01D 25/18* (2006.01)
(Continued)

(52) U.S. Cl.
CPC ............. *F01D 25/18* (2013.01); *F01D 25/16* (2013.01); *F01D 25/162* (2013.01); *F02B 39/00* (2013.01);
(Continued)

(58) Field of Classification Search
CPC .... F16C 2360/24; F01D 25/18; F01D 15/162; F04D 29/051; F04D 29/056; F04D 29/053
See application file for complete search history.

(56) References Cited

U.S. PATENT DOCUMENTS

| 9,091,208 B2 * | 7/2015 | Petitjean ................. F01D 25/14 |
| 2017/0009810 A1 * | 1/2017 | Futae ....................... F02B 39/14 |
| 2017/0074113 A1 * | 3/2017 | Murayama .......... F16C 33/6659 |

FOREIGN PATENT DOCUMENTS

| JP | 2001-140654 A | 5/2001 |
| JP | 4314627 B2 | 8/2009 |

(Continued)

OTHER PUBLICATIONS

Written Opinion of the International Searching Authority and International Search Report (forms PCT/ISA/237, PCT/ISA/210 and PCT/ISA/220), dated Dec. 8, 2015, for International Application No. PCT/JP2015/075683, with partial trans. of the Written Opinion and trans. of the International Search Report.

*Primary Examiner* — Thomas R Hannon
(74) *Attorney, Agent, or Firm* — Birch, Stewart, Kolasch & Birch, LLP

(57) ABSTRACT

A bearing device for a turbocharger according to one embodiment of the present invention includes: a rotational shaft; a journal bearing device including a compressor-side journal bearing and a turbine-side journal bearing; a bearing housing including a compressor-side bearing supporting portion, a turbine-side bearing supporting portion, and a bearing housing main body; and a lubricant oil guide member extending along a circumference direction of the rotational shaft, at an outer circumference side of at least one of the compressor-side bearing supporting portion and the turbine-side bearing supporting portion. When a virtual line extending vertically downward from a rotational center CL (Continued)

of the rotational shaft is defined as a reference line VL in a state where an oil discharge port is orientated downward, the lubricant oil guide member extends from the reference line VL along the circumference direction toward each of one side and another side of the reference line VL over a predetermined angle θ about the rotational center CL of the rotational shaft.

14 Claims, 12 Drawing Sheets

(51) Int. Cl.
    *F02B 39/00*     (2006.01)
    *F02B 39/14*     (2006.01)
    *F01D 25/16*     (2006.01)
    *F04D 29/051*    (2006.01)
    *F04D 29/056*    (2006.01)
    *F04D 29/063*    (2006.01)
    *F02B 37/00*     (2006.01)
    *F04D 29/053*    (2006.01)

(52) U.S. Cl.
    CPC ............ *F02B 39/14* (2013.01); *F04D 29/051* (2013.01); *F04D 29/056* (2013.01); *F04D 29/063* (2013.01); *F16C 17/00* (2013.01); *F02B 37/00* (2013.01); *F04D 29/053* (2013.01); *F05D 2220/40* (2013.01)

(56) References Cited

FOREIGN PATENT DOCUMENTS

| | | |
|---|---|---|
| JP | 2013-53566 A | 3/2013 |
| JP | 2014-66233 A | 4/2014 |
| JP | 2014-156822 A | 8/2014 |

\* cited by examiner

FIG. 10
(a)
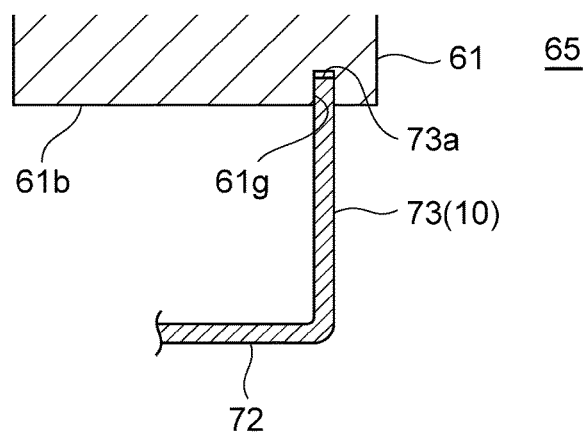
(b)
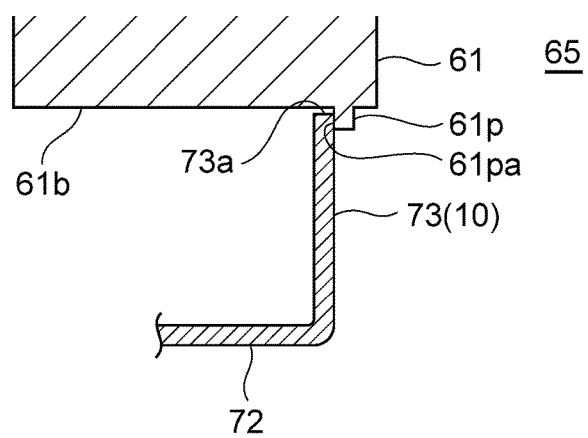

BEARING DEVICE FOR TURBOCHARGER, AND TURBOCHARGER

TECHNICAL FIELD

The present disclosure relates to a bearing device for a turbocharger, and a turbocharger.

BACKGROUND

In one conventionally known configuration as a technique for improving an engine output, intake air is compressed by a turbocharger and the resultant compressed intake air is supplied to an engine (turbocharging). This configuration has been widely used for engines in automobiles and the like. Generally, a turbocharger includes: a rotational shaft; a turbine wheel provided on one end side of the rotational shaft; and a compressor wheel provided on the other end side of the rotational shaft. When the rotational shaft rotates at high speed with exhaust energy of the exhaust gas acting on the turbine wheel, the compressor wheel provided to the other end side of the rotational shaft compresses the intake air.

The rotational shaft of the turbocharger is rotatably supported by two journal bearings including: a compressor-side journal bearing provided on a side closer to the compressor; and a turbine-side journal bearing provided on a side closer to the turbine. These two journal bearings are supplied with lubricant oil. Patent Document 1 discloses an example of such a bearing device for a turbocharger.

The bearing device disclosed in Patent Document 1 has, as illustrated in FIG. 1 and FIG. 2 in Patent Document 1, a partition (denoted with reference numeral 34) formed to prevent collision between lubricant oil (denoted with reference numeral LO) flowing from a turbine-side oil discharge path (denoted with reference numeral 32) and lubricant oil flowing from a compressor-side oil discharge path (denoted with reference numeral 33). The partition is formed as a vertical wall extending between an oil discharge port (denoted with reference numeral 21) and an outer circumference portion (denoted with reference numeral 38) supporting an oil discharge port (denoted with reference numeral 20) below a bearing chamber (denoted with reference numeral 3).

CITATION LIST

Patent Literature

Patent Document 1: JP2001-140654A

SUMMARY

Technical Problem

The bearing device disclosed in Patent Document 1 can prevent the collision between the lubricant oil flowing from the turbine-side oil discharge path and the lubricant oil flowing from the compressor-side oil discharge path. However, lubricant oil flowing along the partition and lubricant oil discharged from the oil discharge port might collide with each other (see FIG. 2(b) in Patent Document 1). When this happens, oil discharging performance through the oil discharge port is degraded, resulting in the rotational shaft involving a larger stirring loss and the turbocharger involving a larger mechanical loss.

At least one embodiment of the present invention is made in view of the problem of the conventional technique described above, and an object thereof is to provide a bearing device for a turbocharger and a turbocharger that has an excellent oil discharging performance and thus can achieve a smaller mechanical loss.

Solution to Problem (1) A bearing device for a turbocharger according to at least one embodiment of the present invention includes:
a rotational shaft having one end side and another end side provided with a compressor wheel and a turbine wheel, respectively;
a journal bearing device including:
  a compressor-side journal bearing rotatably supporting the rotational shaft; and
  a turbine-side journal bearing disposed closer to the turbine wheel than the compressor-side journal bearing and rotatably supporting the rotational shaft;
a bearing housing including:
  a compressor-side bearing supporting portion having on an inner circumference side thereof a supporting surface supporting the compressor-side journal bearing;
  a turbine-side bearing supporting portion having on an inner circumference side thereof a supporting surface supporting the turbine-side journal bearing, the turbine-side bearing supporting portion being disposed to be separated from the compressor-side bearing supporting portion; and
  a bearing housing main body inside which the compressor-side bearing supporting portion and the turbine-side bearing supporting portion are supported, the bearing housing main body including:
    an oil supply hole through which lubricant oil is supplied to the journal bearing device;
    an oil discharge port through which the lubricant oil is discharged to the outside; and
    a discharge oil space formed between the compressor-side bearing supporting portion and the turbine-side bearing supporting portion; and
  a lubricant oil guide member extending along a circumference direction of the rotational shaft, at an outer circumference side of at least one of the compressor-side bearing supporting portion and the turbine-side bearing supporting portion.

When a virtual line extending vertically downward from a rotational center of the rotational shaft is defined as a reference line in a state where the oil discharge port is orientated downward, the lubricant oil guide member extends from the reference line along the circumference direction toward each of one side and another side of the reference line over a predetermined angle about the rotational center of the rotational shaft.

In the embodiment (1), the lubricant oil supplied to the compressor-side journal bearing or the turbine-side journal bearing and discharged from the discharge oil space is guided by the lubricant oil guide member to the oil discharge port. Thus, the lubricant oil discharged from the discharge oil space flows along the outer circumference surface of the compressor-side bearing supporting portion or the turbine-side bearing supporting portion, and thus can be prevented from colliding with the lubricant oil discharged from the compressor side of the compressor-side bearing supporting portion or with the lubricant oil discharged from the turbine side of the turbine-side bearing supporting portion. Thus, increase in a mechanical loss of the turbocharger due to degradation of oil discharging performance can be suppressed.

(2) According to some embodiments, in the bearing device for a turbocharger having the configuration described in the embodiment (1), the lubricant oil guide member includes at least one protruding portion protruding from an outer circumference surface of at least one of the compressor-side bearing supporting portion and the turbine-side bearing supporting portion.

In the embodiment (2), the lubricant oil guide member is formed with the at least one protruding portion protruding from the outer circumference surface of at least one of the compressor-side bearing supporting portion and the turbine-side bearing supporting portion. Thus, increase in the mechanical loss of the turbocharger due to degradation of oil discharging performance can be suppressed. For example, the protruding portion may be integrally formed with the housing by casting or the other like processes.

(3) According to some embodiments, in the bearing device for a turbocharger having the configuration described in the embodiment (2), the protruding portion is formed, on a side of the discharge oil space, on an end portion of the outer circumference surface of the at least one of the compressor-side bearing supporting portion and the turbine-side bearing supporting portion.

In the embodiment (3), the lubricant oil discharged from the discharge oil space can be smoothly guided to the oil discharge port without flowing along the outer circumference surface of the compressor-side bearing supporting portion or the turbine-side bearing supporting portion.

(4) According to some embodiments, in the bearing device for a turbocharger having the configuration described in the embodiment (2) or (3), the protruding portion has a side surface which is, on a side opposite to the discharge oil space, inclined toward the discharge oil space from a base end toward a distal end of the side surface.

In the embodiment (4), flows of the lubricant oil discharged from the compressor side and the lubricant oil discharged from the turbine side of the turbine-side bearing supporting portion are facilitated along the side surface of the protruding portion on the side opposite to the discharge oil space. Thus, the lubricant oil discharged can be smoothly guided toward the oil discharge port.

(5) According to some embodiments, in the bearing device for a turbocharger having the configuration described in any one of the embodiments (2) to (4), the protruding portion has a side surface which is, on a side of the discharge oil space, inclined toward the discharge oil space from a base end toward a distal end of the side surface.

In the embodiment (5), the lubricant oil discharged from the discharge oil space can be more effectively prevented from flowing along the outer circumference surface of the compressor-side bearing supporting portion or the turbine-side bearing supporting portion.

(6) According to some embodiments, in the bearing device for a turbocharger having the configuration described in any one of the embodiments (2) to (5), the at least one protruding portion includes: a first protruding portion; and a second protruding portion which is formed at a position further separated from the discharge oil space than the first protruding portion and formed to be separated from the first protruding portion.

In the embodiment (6), the at least one protruding portion includes: the first protruding portion; and the second protruding portion which is formed at a position further separated from the discharge oil space than the first protruding portion and formed to be separated from the first protruding portion. Thus, the outer circumference surfaces of the compressor-side bearing supporting portion and the turbine-side bearing supporting portion each have a recessed shape as a whole. Thus, the lubricant oil discharged from the discharge oil space can be even more effectively prevented from flowing along the outer circumference surface of the compressor-side bearing supporting portion or the turbine-side bearing supporting portion.

(7) According to some embodiments, the bearing device for a turbocharger having the configuration described in any one of the embodiments (1) to (6) further includes:
 a thrust bearing which is disposed closer to the compressor wheel than the compressor-side journal bearing and supports the rotational shaft in a thrust direction; and
 an oil deflector including:
  a main body portion which is disposed at a position closer to the compressor wheel than the thrust bearing and faces the thrust bearing;
  a tongue portion which extends between the compressor-side bearing supporting portion and the oil discharge port from the main body portion toward the compressor wheel; and
  a guide portion that extends from the tongue portion toward the outer circumference surface of the compressor-side bearing supporting portion.

The lubricant oil guide member includes the guide portion.

In the embodiment (7), the lubricant oil guide member provided on the compressor side can be formed with the guide portion of the oil deflector. For example, the oil deflector manufactured by a relatively low-cost process such as pressing for example. Thus, in such an embodiment, the bearing device for the turbocharger including the lubricant oil guide member can be provided at a low cost.

(8) According to some embodiments, in the bearing device for a turbocharger having the configuration described in the embodiment (7), the tongue portion includes an opening formed at a position closer to the main body portion than the guide portion.

In the embodiment (8), the lubricant oil discharged from the compressor side of the compressor-side bearing supporting portion can be discharged to the oil discharge port through the opening. Thus, oil discharging performance on the compressor side can be enhanced.

(9) According to some embodiments, in the bearing device for a turbocharger having the configuration described in the embodiment (7) or (8), a groove portion is formed on the outer circumference surface of the compressor-side bearing supporting portion, and a distal end portion of the guide portion is inserted in the groove portion.

In the embodiment (9), the structure in which the distal end portion of the guide portion is inserted in the groove portion is employed. Thus, the lubricant oil discharged from the discharge oil space can be even more effectively prevented from flowing along the outer circumference surface of the compressor-side bearing supporting. Furthermore, the oil deflector can be more easily assembled.

(10) According to some embodiments, in the bearing device for a turbocharger having the configuration described in any one of the embodiments (7) to (9), a protrusion is formed on the outer circumference surface of the compressor-side bearing supporting portion, and the distal end portion of the guide portion comes into contact with a side surface of the protrusion.

In the embodiment (10), the structure in which the distal end portion of the guide portion is brought into contact with the side surface of the protrusion. Thus, the lubricant oil discharged from the discharge oil space can be even more effectively prevented from flowing along the outer circumference surface of the compressor-side bearing supporting portion. Furthermore, the oil deflector can be more easily assembled.

(11) According to some embodiments, in the bearing device for a turbocharger having the configuration described in any one of the embodiments (1) to (10), the lubricant oil guide member extends from the reference line in the circumference direction toward each of one side and another side of the reference line over a range of at least 30° about the rotational center of the rotational shaft.

The lubricant oil discharged from the discharge oil space flows along the outer circumference surface over the predetermined angle range from a lowermost portion (a position through which the reference line VL passes) of the outer circumference surface of the outer circumference surface of the compressor-side bearing supporting portion or the turbine-side bearing supporting portion. Thus, in the embodiment (11), the lubricant oil discharged from the discharge oil space is prevented from colliding with the lubricant oil discharged from the compressor side of the compressor-side bearing supporting portion or with the lubricant oil discharged from the turbine side of the turbine-side bearing supporting portion, whereby oil discharging performance can be improved.

(12) According to some embodiments, in the bearing device for a turbocharger having the configuration described in the embodiment (11), the lubricant oil guide member is configured of at least one protruding portion protruding from an outer circumference surface of at least one of the compressor-side bearing supporting portion and the turbine-side bearing supporting portion. The lubricant oil guide member extends along the circumference direction of the rotational shaft to a position to come into contact with an inner circumference wall surface of the housing main body on at least one of the one side and the other side.

In the embodiment (12), the protruding portion as the lubricant oil guide member functions as a rigid member for reinforcing the compressor-side bearing supporting portion or the turbine-side bearing supporting portion, whereby the bearing housing with higher rigidity as a whole can be achieved.

(13) According to some embodiments, in the bearing device for a turbocharger having the configuration described in the embodiment (11) or (12), when the one side and the other side of the reference line are defined as an upstream side and a downstream side respectively in a rotational direction of the rotational shaft, the lubricant oil guide member is formed to have a circumference-direction length extending on the other side longer than a circumference-direction length extending on the one side.

In the embodiment (13) the lubricant oil that has scattered on the downstream side of the rotational direction due to centrifugal force of the rotational shaft can be prevented from flowing along the outer circumference surface of the compressor-side bearing supporting portion or the turbine-side bearing supporting portion to collide with the lubricant oil discharged from the compressor side of the compressor-side bearing supporting portion or the lubricant oil discharged from the turbine side of the turbine-side bearing supporting portion.

(14) A turbocharger according to at least one embodiment of the present invention includes the bearing device for a turbocharger having the configuration described in any one of the embodiments (1) to (13).

Advantageous Effects

At least one embodiment of the present invention can provide a bearing device for a turbocharger and a turbocharger that has an excellent oil discharging performance and thus can achieve a smaller mechanical loss.

BRIEF DESCRIPTION OF DRAWINGS

FIG. 10 is an enlarged view of a guide portion of the oil deflector according to one embodiment of the present invention.

DETAILED DESCRIPTION

Figure 1:
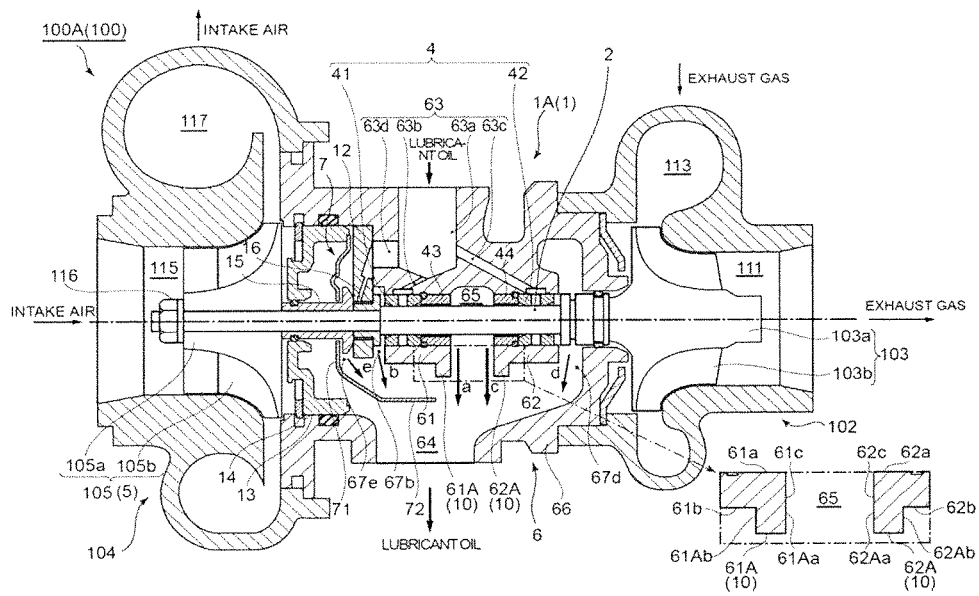
FIG. 1 is a cross-sectional view of a turbocharger according to one embodiment of the present invention taken along an axial direction of a rotational shaft thereof.

The following describes some embodiments of the present invention with reference to the accompanying drawings. It should be noted that the size, material, shape, relative arrangement, and the like of components described in the embodiments and illustrated in the drawings are given by way of example only and are not intended to limit the scope of the present invention to these.

For example, the expressions used herein that mean relative or absolute arrangement, such as "in a direction", "along a direction", "in parallel with", "orthogonal with", "center", and "concentrically", mean not only exactly what they refer to but also such states that are relatively displaced with a tolerance or by an angle or distance that is small enough to achieve the same level of functionality.

The expressions used herein that mean things are equivalent to each other, such as "the same", "equivalent", and "uniform", mean not only exactly equivalent states but also such states that have a tolerance or a difference that is small enough to achieve the same level of functionality.

For example, expressions that represent shapes, such as quadrangles and cylinders, mean not only what they refer to in a geometrically strict sense but also shapes having some irregularities, chamfered portions, or the like that can provide the same level of functionality.

The expressions "including", "comprising", and "provided with" one component are not exclusive expressions that exclude other components.

FIG. 1, FIGS. 3 to 6, FIG. 8, and FIG. 9 are each a cross-sectional view of a turbocharger according to one embodiment of the present invention, taken along an axial direction of a rotational shaft of the turbocharger.

An example of the turbocharger according to one embodiment of the present invention, which is not particularly limited, is a turbocharger installed in an automobile engine, for example.

First of all, a turbocharger 100 according to one embodiment of the present invention is described with reference to the drawings.

The turbocharger 100 (100A, 100B, 100C, 100D, 100E, 100F, and 100G) according to one embodiment of the present invention is formed of three housings including: a turbine housing 102 that accommodates a turbine impeller 103 provided on one end side of a rotational shaft 2; a compressor housing 104 that accommodates a compressor impeller 105 provided on another end side of the rotational shaft 2; and a bearing housing 6 that accommodates a journal bearing device 4 that is described later and rotatably supports the rotational shaft 2 and a thrust bearing 12 that supports the rotational shaft 2 in a thrust direction as illustrated in FIG. 1, FIGS. 3 to 6, FIG. 8, and FIG. 9.

The turbine housing 102 has: an outer circumference portion in which a turbine scroll flow path 113 in a spiral form is formed. The turbine impeller 103 is disposed in a center portion of the turbine scroll flow path 113. The turbine impeller 103 includes: a turbine hub 103a having a truncated conical shape obtained by cutting off a top portion of a cone with a plane in parallel with a bottom surface; and a plurality of turbine blades 103b protruding in a radial direction from a circumference surface of the turbine hub 103a. The turbine hub 103a of the turbine impeller 103 is joined to one end portion of the rotational shaft 2 by welding for example. Exhaust gas that has acted on the turbine impeller 103 while flowing in the turbine scroll flow path 113 is discharged to the outside of the turbine housing 102 through an exhaust gas outflow port 111 that is open in an axial direction of the rotational shaft 2.

A compressor scroll flow path 117 in a spiral form is formed in an outer circumference portion of the compressor housing 104. The compressor impeller 105 is disposed in a center portion of the compressor scroll flow path 117. The compressor impeller 105 includes: a compressor hub 105a having a truncated conical shape obtained by cutting off a top portion of a cone with a plane in parallel with a bottom surface; and a plurality of compressor blades 105b radially protruding from a circumference surface of the compressor hub 105a. An insertion hole (not illustrated) in which the other end side of the rotational shaft 2 is inserted is formed in a center portion of the compressor hub 105a of the compressor impeller 105. The compressor impeller 105 is fixed to the other end portion of the rotational shaft 2, with a nut 116 on a distal end of the compressor hub 105a fastened after one end side of the rotational shaft 2 is inserted in the insertion hole. Intake gas flowing in through an intake air inlet port 115 that is open in the axial direction of the rotational shaft 2 is compressed by the compressor impeller 105, and the resultant gas flows in the compressor scroll flow path 117 to be supplied to an unillustrated engine.

The bearing housing 6 is disposed between the turbine housing 102 and the compressor housing 104, and has one end side coupled to the turbine housing 102 and the other end side coupled to the compressor housing 104. The bearing housing 6 incorporates an inner space such that the rotational shaft 2 can be inserted in the axial direction. The inner space accommodates the journal bearing device 4 and the thrust bearing 12 described above.

In the turbocharger 100, the bearing device 1 (1A, 1B, 1C, 1D, 1E, 1F, 1G) for the turbocharger 100 is formed by the rotational shaft 2, the journal bearing device 4, and the bearing housing 6 described above as well as a lubricant oil guide member 10 described below.

The bearing device 1 for the turbocharger 100 according to one embodiment of the present invention is described below with reference to the drawings.

As illustrated in FIG. 1, FIGS. 3 to 6, FIG. 8, and FIG. 9, the journal bearing device 4 according to one embodiment of the present invention includes: a compressor-side journal bearing 41 rotatably supporting the rotational shaft 2; and a turbine-side journal bearing 42 disposed closer to the turbine wheel than the compressor-side journal bearing 41 and rotatably supporting the rotational shaft 2.

In the illustrated embodiment, the compressor-side journal bearing 41 and the turbine-side journal bearing 42 are formed as cylindrical floating bushes supported, while floating due to oil film pressure of the lubricant oil supplied, between the outer circumference surface of the rotational shaft 2 and the inner circumference surface (supporting surface) 61a in a compressor-side bearing supporting portion 61 and the inner circumference surface (supporting surface) 62a in a turbine-side bearing supporting portion 62.

As illustrated in FIG. 1, FIGS. 3 to 6, FIG. 8, and FIG. 9, the bearing housing 6 according to one embodiment of the present invention includes: the compressor-side bearing supporting portion 61 having on an inner circumference side thereof the supporting surface 61a supporting the compressor-side journal bearing 41; the turbine-side bearing supporting portion 62 having on an inner circumference side thereof the supporting surface 62a supporting the turbine-side journal bearing 42, the turbine-side bearing supporting portion 62 being disposed to be separated from the compressor-side bearing supporting portion 61; and a bearing housing main body 66 inside which the compressor-side bearing supporting portion 61 and the turbine-side bearing supporting portion 62 are supported.

The bearing housing main body 66 includes: an oil supply hole 63 through which lubricant oil is supplied to the journal bearing device 4; an oil discharge port 64 through which the lubricant oil is discharged to the outside; and a discharge oil space 65 formed between the compressor-side bearing supporting portion 61 and the turbine-side bearing supporting portion 62. The discharge oil space 65 has a circumferential form and is formed along a circumference direction of the rotational shaft 2 between the compressor-side bearing supporting portion 61 and the turbine-side bearing supporting portion 62. The turbocharger 100 is installed in the engine while being in a state with the oil discharge port 64 of the bearing housing 6 oriented vertically downward, that is, with a centroid of the oil discharge port 64 disposed at the lowest position.

In the illustrated embodiment, the oil supply hole 63 includes: an inlet-side oil supply hole 63a as a portion through which the lubricant oil is supplied from the outside;

a compressor-side oil supply hole 63b for suppling the lubricant oil to the compressor-side journal bearing 41; a turbine-side oil supply hole 63c for supplying the lubricant oil to the turbine-side journal bearing 42; and a thrust-side oil supply hole 63d for supplying the lubricant oil to the thrust bearing 12. The compressor-side oil supply hole 63b, the turbine-side oil supply hole 63c, and the thrust-side oil supply hole 63d are each in communication with the inlet-side oil supply hole 63a.

In the illustrated embodiment, a compressor-side movement restriction member 43 in a C-ring form, for restricting movement of the compressor-side journal bearing 41 in the axial direction, is provided on the side of the discharge oil space 65 of the compressor-side journal bearing 41. A turbine-side movement restriction member 44 in a C-ring form for restricting movement of the turbine-side journal bearing 42 in the axial direction is provided on the side of the discharge oil space 65 of the turbine-side journal bearing 42.

The lubricant oil supplied to the inlet-side oil supply hole 63a from the outside of the bearing housing 6 is supplied to the compressor-side journal bearing 41 through the compressor-side oil supply hole 63b. Part of the lubricant oil supplied to the compressor-side journal bearing 41 passes through a gap between an inner circumference surface of the compressor-side movement restriction member 43 and the rotational shaft 2, and then flows in the discharge oil space 65. Then, this lubricant oil is discharged to the outside of the bearing housing 6 through the oil discharge port 64 (an arrow a in the figure). The remaining part of the lubricant oil supplied to the compressor-side journal bearing 41 flows through a gap 67b formed between the compressor-side bearing supporting portion 61 on the compressor side of the compressor-side bearing supporting portion 61 and the thrust bearing 12, and is discharged to the outside of the bearing housing 6 through the oil discharge port 64 (an arrow b in the figure).

The lubricant oil supplied to the inlet-side oil supply hole 63a from the outside of the bearing housing 6 is supplied to the turbine-side journal bearing 42 through the turbine-side oil supply hole 63c. Part of the lubricant oil supplied to the turbine-side journal bearing 42 passes through a gap between an inner circumference surface of the movement restriction member 44 and the rotational shaft 2, and then flows in the discharge oil space 65. Then, this lubricant oil is discharged to the outside of the bearing housing 6 through the oil discharge port 64 (an arrow c in the figure). The remaining part of the lubricant oil supplied to the turbine-side journal bearing 42 flows in a turbine-side oil discharge path 67d formed on a turbine wheel side of the turbine-side bearing supporting portion 62, and is discharged to the outside of the bearing housing 6 through the oil discharge port 64 (an arrow d in the figure).

The lubricant oil supplied to the inlet-side oil supply hole 63a from the outside of the bearing housing 6 is supplied to the thrust bearing 12 through the thrust-side oil supply hole 63d. Part of the lubricant oil supplied to the thrust bearing 12 flows in a thrust-side oil discharge path 67e formed between the thrust bearing 12 and a later described oil deflector 7 disposed on the compressor side of the thrust bearing 12, and is discharged to the outside of the bearing housing 6 through the oil discharge port 64 (an arrow e in the figure).

In the illustrated embodiment, two thrust collars are attached to the rotational shaft 2. The two thrust collars include: a first thrust collar 15; and a second thrust collar 16 positioned closer to the turbine wheel than the first thrust collar 15. The thrust bearing 12 is attached to an outer circumference side of the second thrust collar 16. The oil deflector 7 is attached to an outer circumference side of the first thrust collar 15. A retainer 13 is attached to a portion, on the outer circumference side of the first thrust collar 15, on the compressor side of the oil deflector 7. The retainer 13 is configured in such a manner that the oil deflector 7 and the thrust bearing 12 are held between a step portion formed on an inner circumference wall of the bearing housing main body 66 and the retainer 13. The retainer 13 is biased toward the turbine wheel by a snap spring 14 fit in a groove formed on the inner circumference wall of the bearing housing main body 66.

As illustrated in FIG. 1, FIGS. 3 to 6, FIG. 8, and FIG. 9, the bearing device 1 for the turbocharger 100 according to one embodiment of the present invention includes the lubricant oil guide member 10 extending along a circumference direction of the rotational shaft 2, at an outer circumference side of at least one of the compressor-side bearing supporting portion 61 and the turbine-side bearing supporting portion 62.

Figure 2:
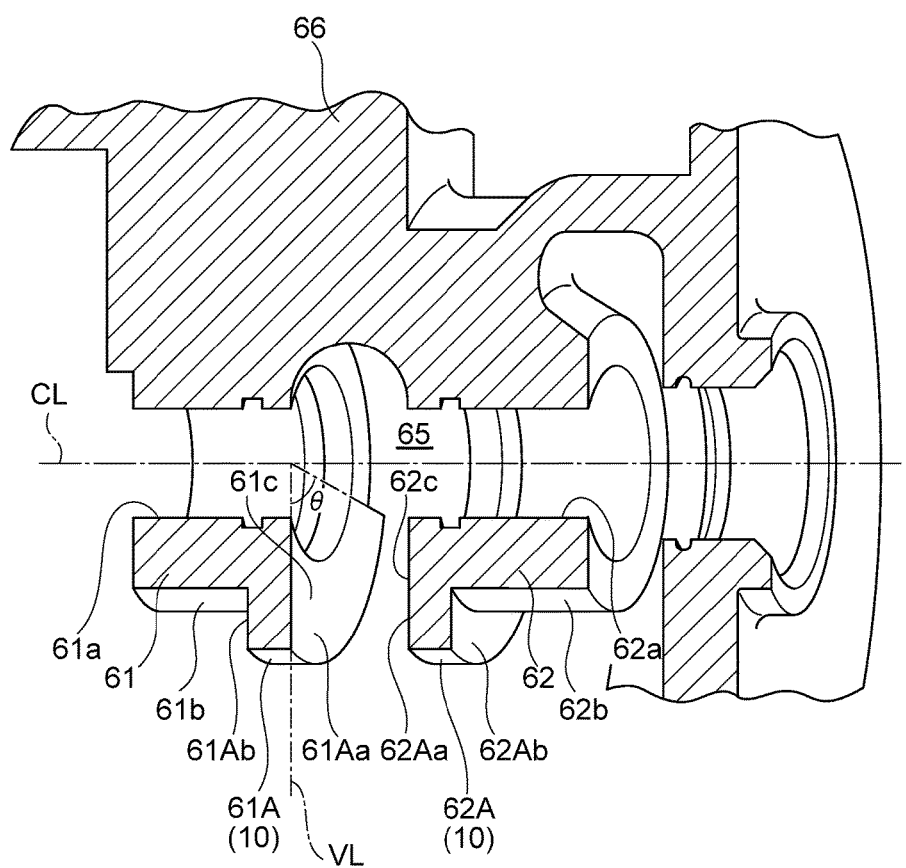
FIG. 2 is an enlarged perspective view of a portion around a compressor-side bearing supporting portion and a turbine-side bearing supporting portion in a bearing housing in FIG. 1.
Figure 11:
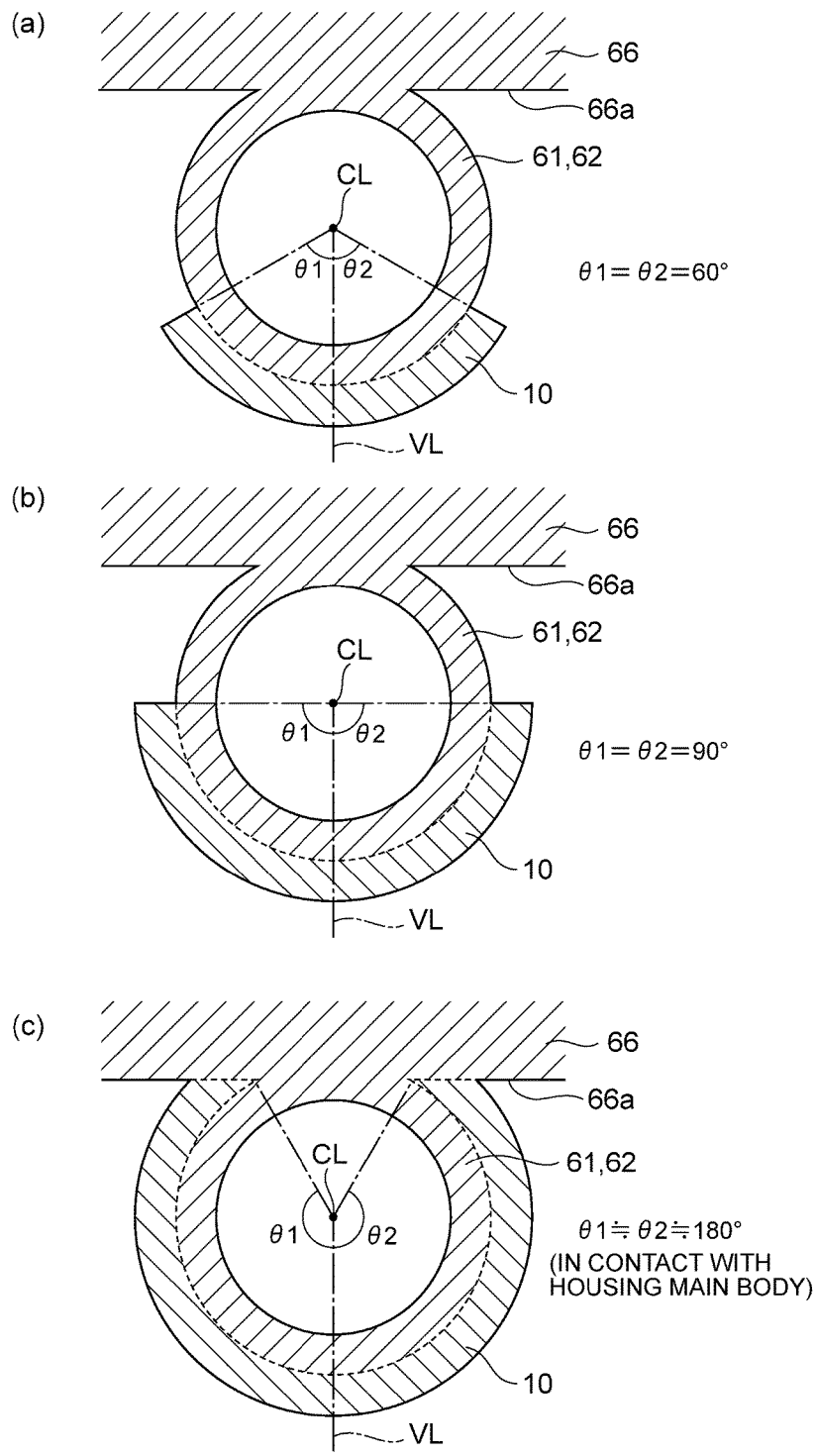
FIG. 11 is a diagram illustrating a range in which the lubricant oil guide member according to one embodiment of the present invention is formed.
Figure 12:
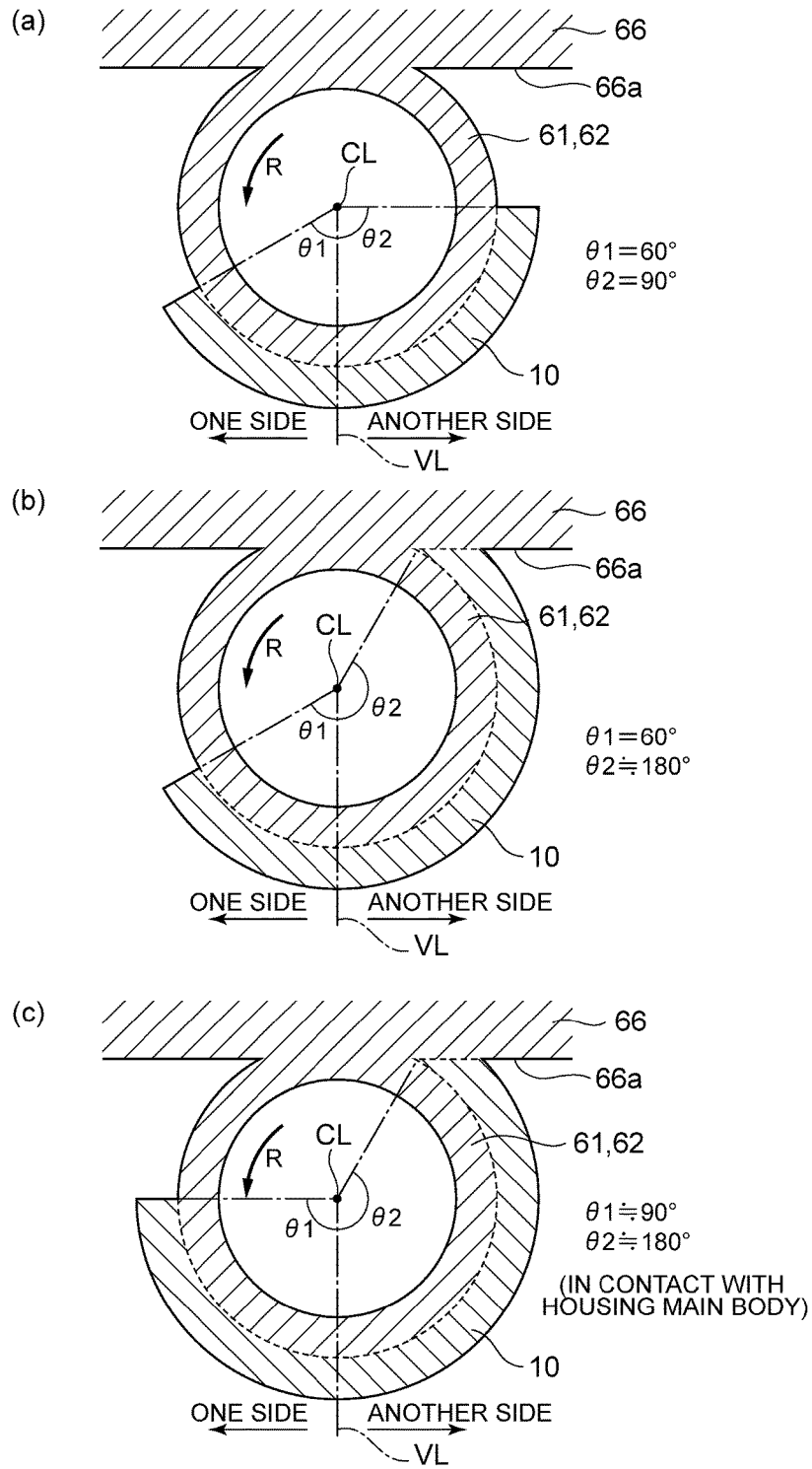
FIG. 12 is a diagram illustrating a range in which the lubricant oil guide member according to one embodiment of the present invention is formed.

FIG. 2 is an enlarged perspective view of a portion around the compressor-side bearing supporting portion and the turbine-side bearing supporting portion in the bearing housing in FIG. 1. FIG. 11 and FIG. 12 are each a diagram illustrating a range in which a lubricant oil guide member according to one embodiment of the present invention is formed.

As illustrated in FIG. 2, FIG. 11, and FIG. 12, when a virtual line extending vertically downward from a rotational center CL of the rotational shaft 2 is defined as a reference line VL in a state where the oil discharge port 64 is orientated downward, the lubricant oil guide member 10 according to one embodiment of the present invention extends from the reference line along the circumference direction toward each of one side and another side of the reference line VL over a predetermined angle θ about the rotational center CL of the rotational shaft 2.

In such an embodiment, the lubricant oil guide member 10 guides the lubricant oil, supplied to the compressor-side journal bearing 41 or the turbine-side journal bearing 42 and discharged from the discharge oil space 65 formed between the compressor-side bearing supporting portion 61 and the turbine-side bearing supporting portion 62, to the oil discharge port 64. Thus, the lubricant oil discharged from the discharge oil space 65 flows along the outer circumference surface 61b or 62b of the compressor-side bearing supporting portion 61 or the turbine-side bearing supporting portion 62 so as not to collide with the lubricant oil discharged from the compressor side (the gap 67b and the thrust-side oil discharge path 67e) of the compressor-side bearing supporting portion 61 or the lubricant oil discharged from the turbine side (turbine-side oil discharge path 67d) of the turbine-side bearing supporting portion 62. Thus, increase in the mechanical loss of the turbocharger 100 due to the deterioration of the oil discharging performance can be suppressed.

In some embodiments, as illustrated in FIGS. 1 to 5 and FIG. 9, the lubricant oil guide member 10 includes at least one of protruding portions 61A to 61E and 62A to 62E protruding from an outer circumference surface 61b and/or 62b of at least one of the compressor-side bearing supporting portion 61 and the turbine-side bearing supporting portion 62.

In the illustrated embodiment, the protruding portions 61A to 61E and 62A to 62E are integrally formed with the compressor-side bearing supporting portion 61 and the turbine-side bearing supporting portion 62 by casting. Alternatively, the protruding portions 61A to 61E and 62A to 62E may be formed separately from the compressor-side bearing supporting portion 61 and the turbine-side bearing supporting portion 62, and attached to the outer circumference surfaces 61b and 62b of the compressor-side bearing supporting portion 61 and the turbine-side bearing supporting portion 62.

In the embodiment illustrated in FIGS. 1 to 5, the protruding portions 61A to 61E and 62A to 62E each protrudes from a corresponding one of the outer circumference surfaces 61b and 62b of both of the compressor-side bearing supporting portion 61 and the turbine-side bearing supporting portion 62.

In this embodiment, the lubricant oil guide member 10 is formed with at least one of the protruding portions 61A to 61E and 62A to 62E protruding from at least one of the outer circumference surface 61b and/or 62b of at least one of the compressor-side bearing supporting portion 61 and the turbine-side bearing supporting portion 62. Thus, increase in the mechanical loss of the turbocharger 100 due to the deterioration of the oil discharging performance can be suppressed.

In some embodiments, as illustrated in FIGS. 1 to 5 and FIG. 9, the protruding portions 61A to 61D and/or 62A to 62D are formed on an end portion, on the side of the discharge oil space 65, of the outer circumference surfaces 61b and/or 62b of at least one of the compressor-side bearing supporting portion 61 and the turbine-side bearing supporting portion 62.

In the illustrated embodiment, the protruding portions 61A to 61D or 62A to 62D are each formed in such a manner that side surfaces 61Aa, 61Ba, 61Ca, and 61Da or 62Aa, 62Ba, 62Ca, and 62Da of the protruding portions 61A to 61D or 62A to 62D on the side of the discharge oil space 65 are flush with the side surface 61c or 62c on the side of the discharge oil space 65 of the compressor-side bearing supporting portion 61 or the turbine-side bearing supporting portion 62. In other words, the protruding portions 61A to 61D or 62A to 62D are formed without involving a level difference between the side surface 61c or 62c on the side of the discharge oil space 65 of the compressor-side bearing supporting portion 61 or the turbine-side bearing supporting portion 62 and the side surfaces 61Aa, 61Ba, 61Ca, and 61Da or 62Aa, 62Ba, 62Ca, and 62Da of the protruding portions 61A to 61D or 62A to 62D on the side of the discharge oil space 65.

In such an embodiment, the lubricant oil discharged from the discharge oil space 65 does not flow along the outer circumference surface 61b or 62b of the compressor-side bearing supporting portion 61 or the turbine-side bearing supporting portion 62. Thus, the lubricant oil discharged from the discharge oil space 65 can be smoothly guided to the oil discharge port 64.

Figure 3:
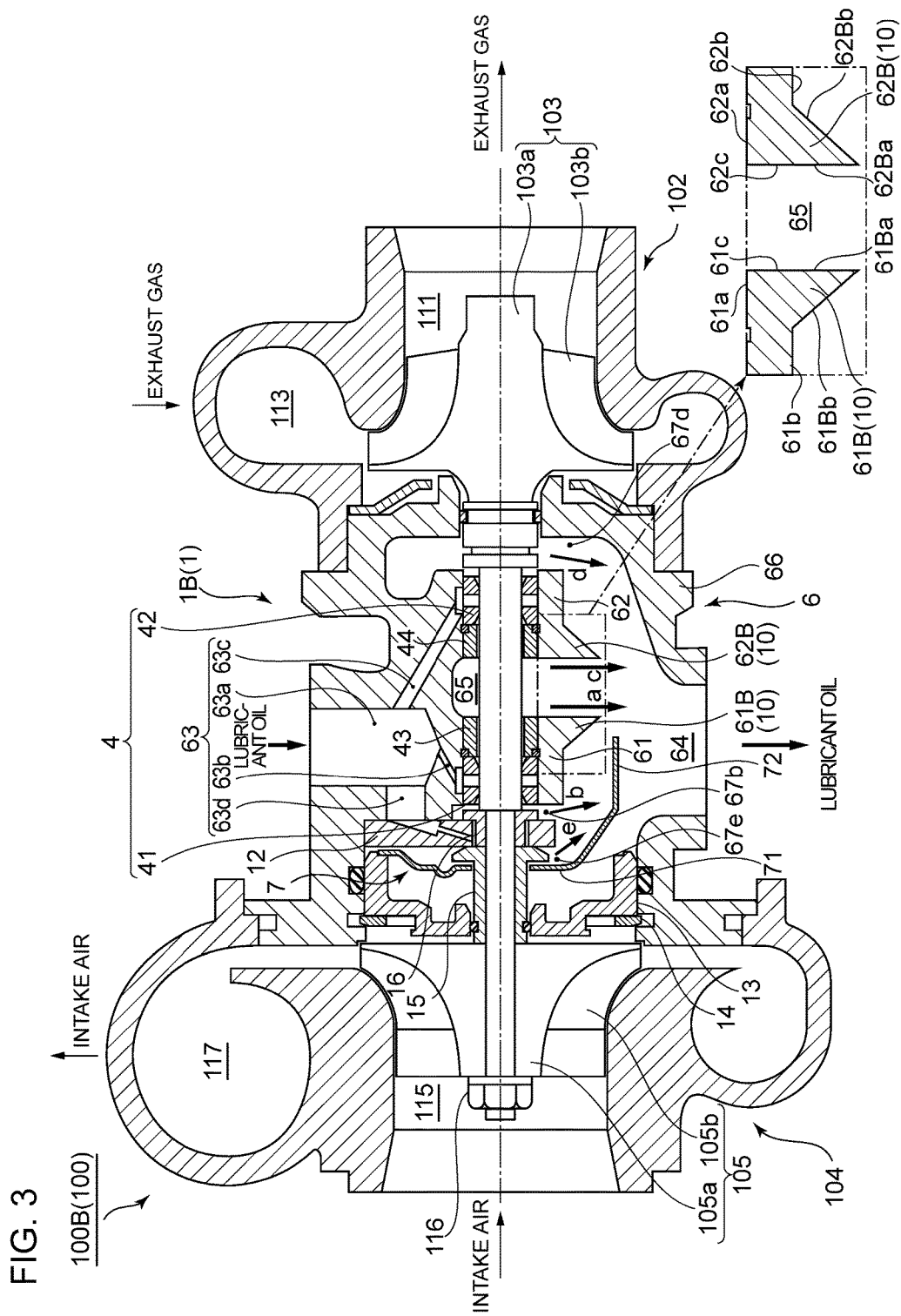
FIG. 3 is a cross-sectional view of the turbocharger according to one embodiment of the present invention taken along the axial direction of the rotational shaft thereof.
Figure 4:
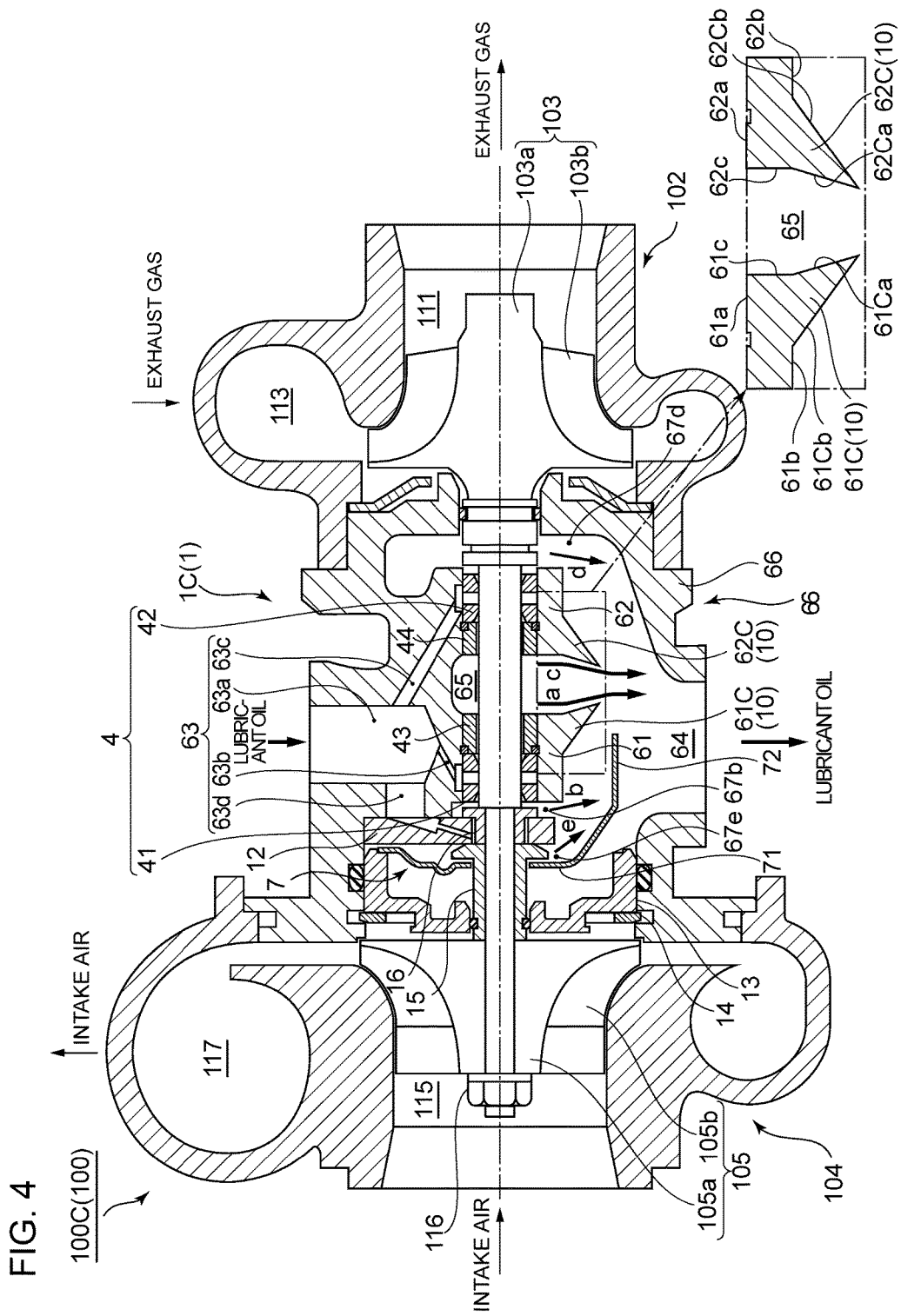
FIG. 4 is a cross-sectional view of the turbocharger according to one embodiment of the present invention taken along the axial direction of the rotational shaft thereof.
Figure 9:
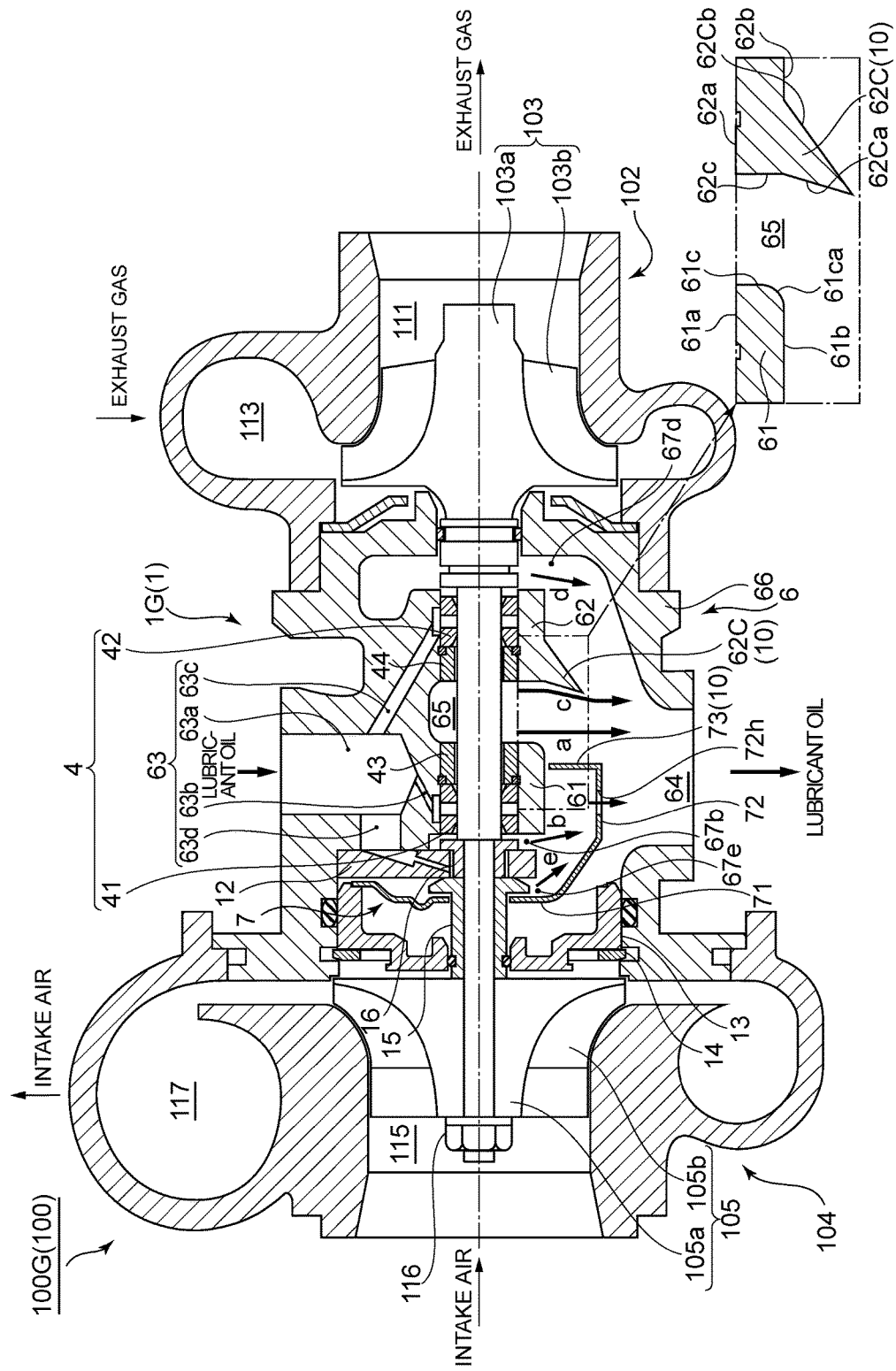
FIG. 9 is a cross-sectional view of the turbocharger according to one embodiment of the present invention taken along the axial direction of the rotational shaft thereof.

In some embodiments, as illustrated in FIG. 3, FIG. 4, and FIG. 9, the protruding portions 61B, 61C, 62B, and 62C have side surfaces 61Bb, 61Cb, 62Bb, and 62Cb, on a side opposite to the discharge oil space 65, which are inclined toward the discharge oil space 65 from base ends toward distal ends of the side surfaces 61Bb, 61Cb, 62Bb, and 62Cb.

In the illustrated embodiment, the protruding portions 61B, 61C, 62B, and 62C each have a triangular shape in a cross-sectional view taken along a direction orthogonal to the circumference direction of the rotational shaft 2. The cross-sectional shape of the protruding portions 61B, 61C, 62B, and 62C is not limited to the triangular shape, and may be a quadrangular shape such as a diamond and a trapezoid, or may also be other polygonal shapes. In the illustrated embodiment, the side surfaces 61Bb, 61Cb, 62Bb, and 62Cb are formed to have a flat form. However, the side surfaces 61Bb, 61Cb, 62Bb, and 62Cb are not limited to the flat form, and may be formed to have a curved form.

In such an embodiment, flows of the lubricant oil discharged from the compressor side (the gap 67b and the thrust-side oil discharge path 67e) of the compressor-side bearing supporting portion 61 and the lubricant oil discharged from the turbine side (the turbine-side oil discharge path 67d) of the turbine-side bearing supporting portion 62 are facilitated along the side surfaces 61Bb, 61Cb, 62Bb, and 62Cb. Thus, the lubricant oil discharged can be smoothly guided toward the oil discharge port 64.

In some embodiments, as illustrated in FIG. 4 and FIG. 9, the side surfaces 61Ca and 62Ca are, on a side of the discharge oil space 65 of the protruding portions 61C and 62C, inclined toward the discharge oil space 65 from the base end toward the distal end of the side surfaces 61Ca and 62Ca.

In the illustrated embodiment, the protruding portions 61B, 61C, 62B, and 62C are formed to have a triangular cross-sectional shape. However, the cross-sectional shape of the protruding portions 61B, 61C, 62B, and 62C is not limited to the triangular shape, and may be a quadrangular shape such as a diamond and a trapezoid, and may also be other polygonal shapes. In the illustrated embodiment, the side surfaces 61Ba, 61Ca, 62Ba, and 62Ca are formed to have a flat form. However, the side surfaces 61Ba, 61Ca, 62Ba, and 62Ca are not limited to the flat form, and may be formed to have a curved form.

In such an embodiment, the lubricant oil discharged from the discharge oil space 65 can be even more effectively prevented from flowing along the outer circumference surfaces 61b and 62b of the compressor-side bearing supporting portion 61 and the turbine-side bearing supporting portion 62.

Figure 5:
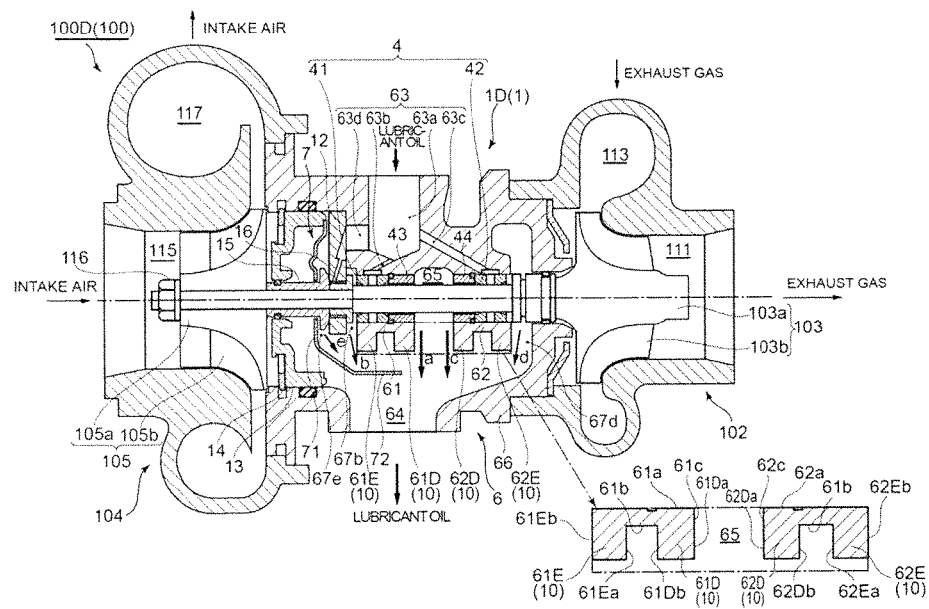
FIG. 5 is a cross-sectional view of the turbocharger according to one embodiment of the present invention taken along the axial direction of the rotational shaft thereof.

In some embodiments, as illustrated in FIG. 5, the at least one of the protruding portions include: the first protruding portions 61D and 62D; and the second protruding portions 61E and 62E which are formed at positions further separated from the discharge oil space 65 than the first protruding portions 61D and 62D and formed to be separated from the first protruding portions 61D and 62D.

In the illustrated embodiment, the first protruding portion 61D is formed in an end portion of the compressor-side bearing supporting portion 61 on a side of the discharge oil space 65, and a second protruding portion 61E is formed in an opposite end portion (a compressor wheel side end portion of the compressor-side bearing supporting portion 61). The first protruding portion 62D is formed in an end portion of the turbine-side bearing supporting portion 62 on a side of the discharge oil space 65, and a second protruding portion 62E is formed in an opposite end portion (a turbine side end portion of the turbine-side bearing supporting portion 62). With the first protruding portions 61D and 62D and the second protruding portions 61E and 61E, the outer circumference surfaces 61b and 62b of the compressor-side bearing supporting portion 61 and the turbine-side bearing supporting portion 62 each have a recessed shape as a whole.

In the illustrated embodiment, the first protruding portions 61D and 62D and the second protruding portions 61E and 61E each have a rectangular cross-sectional shape. However, the present invention is not limited to this, and the cross-sectional shapes as in the embodiments illustrated in FIG. 3 and FIG. 4 may be employed.

In such an embodiment, the outer circumference surfaces 61b and 62b of the compressor-side bearing supporting portion 61 and the turbine-side bearing supporting portion 62 are each formed to have a recessed shape as a whole. Thus, the lubricant oil discharged from the discharge oil space 65 can be more effectively prevented from flowing along the outer circumference surfaces 61b and 62b of the compressor-side bearing supporting portion 61 and the turbine-side bearing supporting portion 62.

Figure 6:
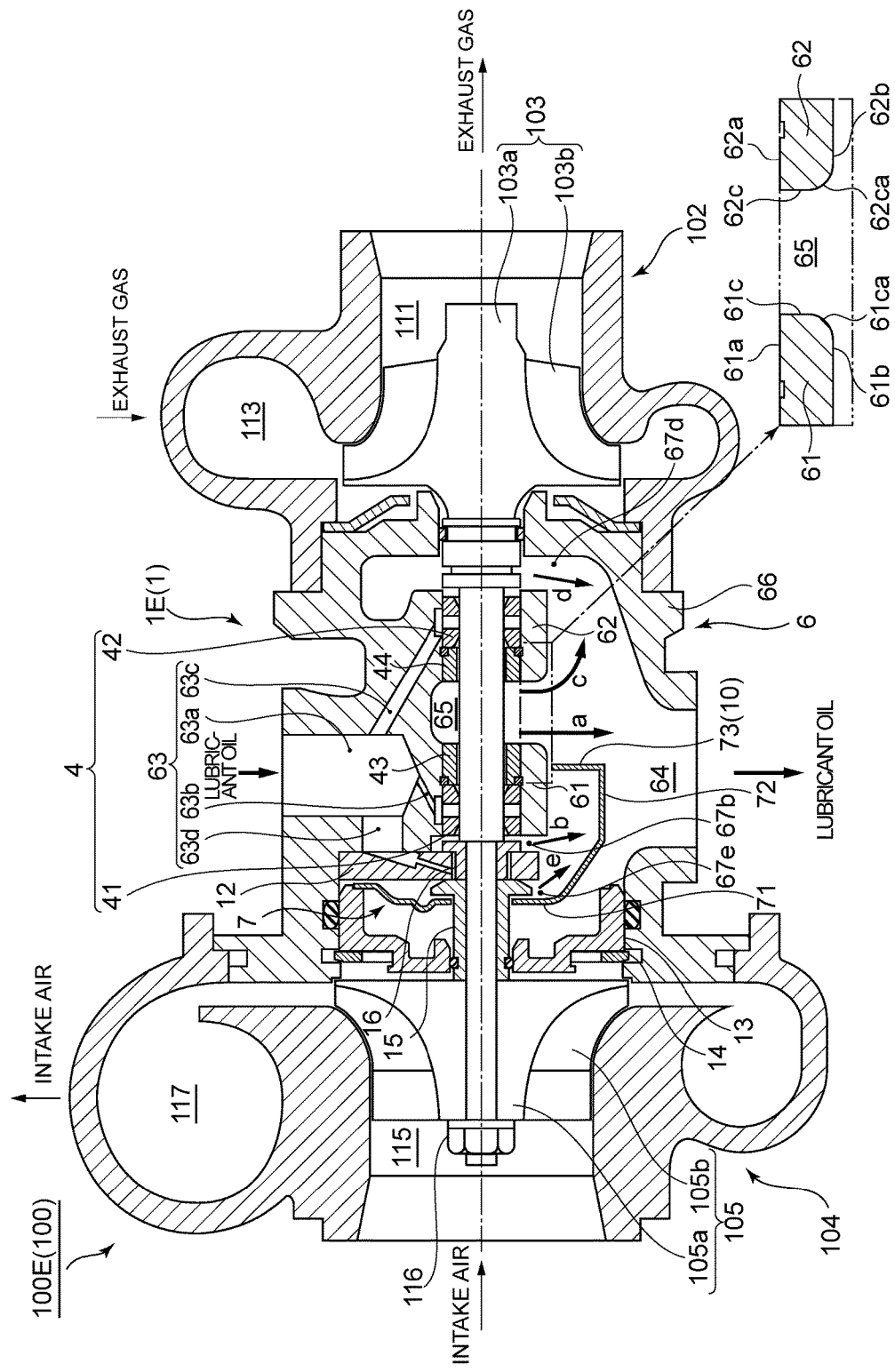
FIG. 6 is a cross-sectional view of the turbocharger according to one embodiment of the present invention taken along the axial direction of the rotational shaft thereof.
Figure 8:
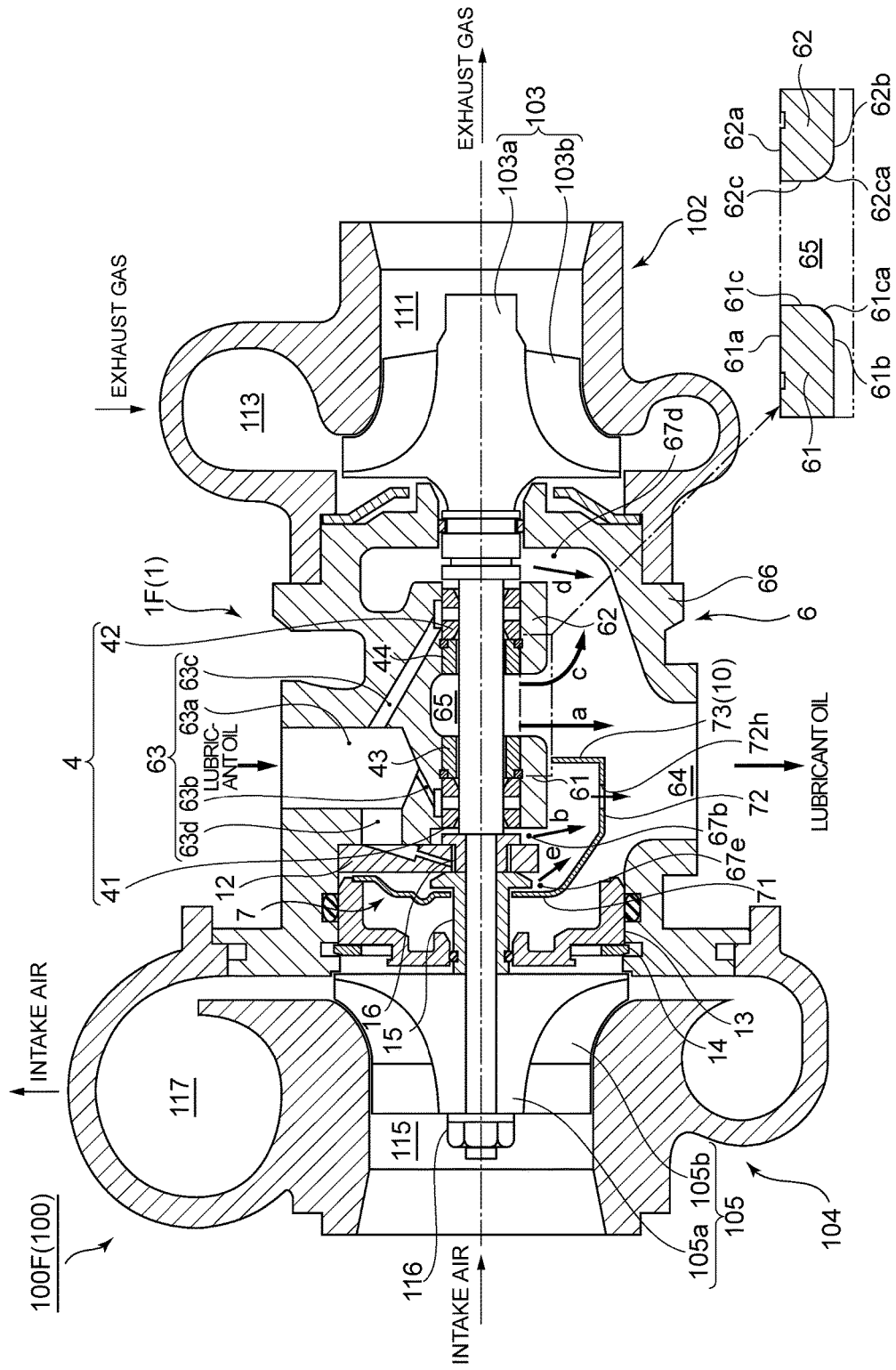
FIG. 8 is a cross-sectional view of the turbocharger according to one embodiment of the present invention taken along the axial direction of the rotational shaft thereof.

In some embodiments, as illustrated in FIG. 6, FIG. 8, and FIG. 9, the bearing device 1 for the turbocharger 100 further includes the thrust bearing 12 and the oil deflector 7 described above.

Figure 7:
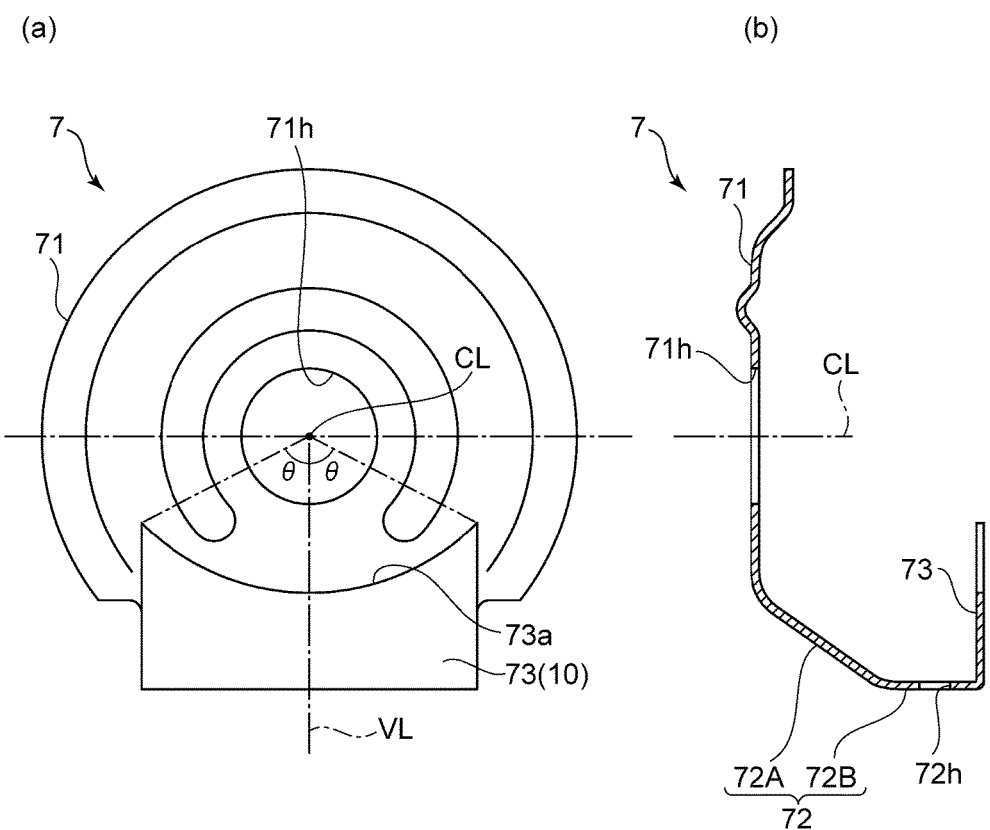
FIG. 7 is a diagram illustrating an example where a lubricant oil guide member according to one embodiment of the present invention is configured of an oil deflector.

FIG. 7 is a diagram illustrating an example where the lubricant oil guide member according to one embodiment of the present invention is configured of an oil deflector.

As illustrated in FIG. 7, the oil deflector 7 is a plate-shaped member, and includes: a main body portion 71 which is disposed at a position closer to the compressor wheel 5 than the thrust bearing 12 and faces the thrust bearing 12; a tongue portion 72 which extends between the compressor-side bearing supporting portion 61 and the oil discharge port 64 from the main body portion 71 toward the compressor wheel 5; and a guide portion 73 that extends from the tongue portion 72 toward the outer circumference surface 61b of the compressor-side bearing supporting portion 61. The lubricant oil guide member 10 described above includes the guide portion 73.

In the illustrated embodiment, the main body portion 71 extends substantially in parallel with an outer surface of the thrust bearing 12, and faces the thrust bearing 12 with a predetermined separation distance in between. A center hole 71h, in which the rotational shaft 2 and the second thrust collar 16 are inserted, is formed in a center portion of the main body portion 71. The tongue portion 72 includes: an inclined portion 72A extending obliquely downward from a lower end portion of the main body portion 71; and a horizontal portion 72B that horizontally extends from a distal end portion of the inclined portion 72A. The horizontal portion 72B extends to a position that is substantially at the center of the oil discharge port 64, but does not reach the end portion of the compressor-side bearing supporting portion 61 on the side of the discharge oil space 65. The guide portion 73 extends vertically upward from the distal end portion of the horizontal portion 72B toward the outer circumference surface 61b of the compressor-side bearing supporting portion 61. The guide portion 73 has a distal end in contact with the outer circumference surface 61b, or separated from the outer circumference surface 61b with a gap too small for the lubricant oil to flow therethrough. The distal end portion 73a of the guide portion 73 has an arch shape, conforming to the shape of the outer circumference surface 61b of the compressor-side bearing supporting portion 61, in front view.

In the illustrated embodiment, the guide portion 73 extends vertically upward, that is, in a direction orthogonal to the outer circumference surface 61b of the compressor-side bearing supporting portion 61. However, the present invention is not limited to this. For example, the guide portion 73 may extend in a direction inclined with respect to the outer circumference surface 61b of the compressor-side bearing supporting portion 61.

In the embodiment illustrated in FIG. 6, FIG. 8, and FIG. 9, a lower end portion 61ca of the side surface 61c of the compressor-side bearing supporting portion 61 on the side of the discharge oil space 65 has a round shape (R-shape). In the embodiment illustrated in FIG. 6 and FIG. 8, a lower end portion 62ca of the side surface 62c of the turbine-side bearing supporting portion 62 on the side of the discharge oil space 65 has a round shape (R-shape). The round shape represents a portion where a casting surface after the casting remains unprocessed. The guide portion 73 extends toward a position without the round shape, that is, a position where the outer circumference surface 61b is flat on a side of the lower end portion 61c opposite to the discharge oil space 65.

In such an embodiment, the lubricant oil guide member 10 on the compressor side can be formed with the guide portion 73 of the oil deflector 7. The oil deflector 7 can be manufactured by a relatively low-cost process such as pressing for example. Thus, in such an embodiment, the bearing device 1 for the turbocharger 100 including the lubricant oil guide member 10 can be provided at a low cost.

In some embodiments, as illustrated in FIGS. 7 to 9, the tongue portion 72 includes an opening 72h formed at a position closer to the main body portion 71 than the guide portion 73.

In the illustrated embodiment, the opening 72h is formed in the horizontal portion 72B of the tongue portion 72. The opening 72h is positioned vertically above the oil discharge port 64.

In such an embodiment, the lubricant oil discharged from the compressor side (the gap 67b and the thrust-side oil discharge path 67e) of the compressor-side bearing supporting portion 61 can be discharged to the oil discharge port 64 through the opening 72h, whereby oil discharging performance can be improved on the compressor side.

FIG. 10 is an enlarged view of the guide portion of the oil deflector according to one embodiment of the present invention.

In some embodiments, as illustrated in FIG. 10(a), a groove portion 61g is formed on the outer circumference surface 61b of the compressor-side bearing supporting portion 61, and a distal end portion 73a of the guide portion 73 is inserted in the groove portion 61g.

In the illustrated embodiment, the groove portion 61g has a width that is substantially the same as a thickness of the distal end portion 73a of the guide portion 73. The distal end portion 73a of the guide portion 73 is fit in the groove portion 61g. Thus, the distal end portion 73a of the guide portion 73 is fixed to the outer circumference surface 61b of the compressor-side bearing supporting portion 61.

In such an embodiment, the structure in which the distal end portion 73a of the guide portion 73 is inserted in the groove portion 61g is employed. Thus, the lubricant oil discharged from the discharge oil space 65 can be even more effectively prevented from flowing along the outer circumference surface 61b of the compressor-side bearing supporting portion 61, and the oil deflector 7 can be more easily assembled.

In some embodiments, as illustrated in FIG. 10(b), a protrusion 61p is formed on the outer circumference surface 61b of the compressor-side bearing supporting portion 61, and the distal end portion 73a of the guide portion 73 comes into contact with a side surface 61pa of the protrusion 61p.

In the illustrated embodiment, the protrusion 61p is positioned closer to the discharge oil space 65 than the guide portion 73.

In such an embodiment, the structure in which the distal end portion 73a of the guide portion 73 comes into contact with the side surface 61pa of the protrusion 61p is employed. Thus, the lubricant oil discharged from the discharge oil space 65 can be even more effectively prevented from flowing along the outer circumference surface 61b of the compressor-side bearing supporting portion 61, and the oil deflector 7 can be more easily assembled.

In some embodiments, as illustrated in FIG. 11, the lubricant oil guide member 10 extends from the reference line VL in the circumference direction of the rotational shaft 2 toward each of one side and the other of the reference line VL over a range of at least 30° about the rotational center CL.

In some embodiments, the lubricant oil guide member 10 extends from the reference line VL in the circumference direction of the rotational shaft 2 toward each of one side and the other side of the reference line VL over a range of at least 60° about the rotational center CL.

In some embodiments, the lubricant oil guide member 10 extends from the reference line VL in the circumference direction of the rotational shaft 2 toward each of one side and the other side of the reference line VL over a range of at least 90° about the rotational center CL.

In some embodiments, the lubricant oil guide member 10 extends from the reference line VL in the circumference direction of the rotational shaft 2 toward each of one side and the other side of the reference line VL over a range of at least 180° about the rotational center CL.

In an embodiment illustrated in FIG. 11(*a*), the lubricant oil guide member 10 extends from the reference line VL in the circumference direction toward each of one side and the other side of the reference line VL over a range of $\theta 1=\theta 2=60°$. In an embodiment illustrated in FIG. 11(*b*), the lubricant oil guide member 10 extends from the reference line VL in the circumference direction toward each of one side and the other side of the reference line VL over a range of $\theta 1=\theta 2=90°$. In an embodiment illustrated in FIG. 11(*c*), the lubricant oil guide member 10 extends from the reference line VL in the circumference direction of the rotational shaft 2 toward each of one side and the other side of the reference line VL over a range of $\theta 1 \cong \theta 2 \cong 180°$ (to be in contact with the inner circumference wall surface 66*a* of the bearing housing main body 66).

The lubricant oil discharged from the discharge oil space flows along the outer circumference surface 61*b* or 62*b* over a predetermined angle range from a lowermost portion serving as the center (a position through which the reference line VL passes) of the outer circumference surface 61*b* or 62*b* of the compressor-side bearing supporting portion 61 or the turbine-side bearing supporting portion 62. Thus, in such an embodiment, the lubricant oil discharged from the discharge oil space 65 is prevented from colliding with the lubricant oil discharged from the compressor side (the gap 67*b* and the thrust-side oil discharge path 67*e*) of the compressor-side bearing supporting portion 61, or with the lubricant oil discharged from the turbine side (turbine-side oil discharge path 67*d*) of the turbine-side bearing supporting portion 62. Thus, the oil discharging performance can be improved.

In some embodiments, as illustrated in FIG. 1 to FIG. 5 described above, the lubricant oil guide member 10 is configured of at least one of protruding portion 61A to 61E and 62A to 62E protruding from the outer circumference surface 61*b* and/or 62*b* of at least one of the compressor-side bearing supporting portion 61 and the turbine-side bearing supporting portion 62. As illustrated in FIG. 11(*b*) and FIGS. 12(*b*) and 12(*c*), the lubricant oil guide member 10 (the protruding portions 61A to 61E or 62A to 62E) extends along the circumference direction of the rotational shaft 2 to a position to come into contact with an inner circumference wall surface 66*a* of the housing main body 66 on at least one of the one side and the other side.

In such an embodiment, the protruding portions 61A to 61E or 62A to 62E as the lubricant oil guide member 10 function as rigid members for reinforcing the compressor-side bearing supporting portion 61 or the turbine-side bearing supporting portion 62, whereby the bearing housing 6 with higher rigidity as a whole can be achieved.

In some embodiments, as illustrated in FIG. 12, when the one side and the other side of the reference line VL are defined as an upstream side and a downstream side respectively in a rotational direction R of the rotational shaft 2, the lubricant oil guide member 10 is formed to have a circumference-direction length extending on the other side longer than a circumference-direction length extending on the one side.

In an embodiment illustrated in FIG. 12(*a*), the lubricant oil guide member 10 extends over a range of $\theta 1=60°$ on the one side (upstream side), and extends over a range of $\theta=90°$ on the other side (downstream side). In an embodiment illustrated in FIG. 12(*b*), the lubricant oil guide member 10 extends over a range of $\theta 1=60°$ on the one side (upstream side), and extends over a range of $\theta=180°$ on the other side (downstream side). In an embodiment illustrated in FIG. 12(*c*), the lubricant oil guide member 10 extends over a range of $\theta 1=90°$ on the one side (upstream side), and extends over a range of $\theta \cong 180°$ on the other side (downstream side) (to be in contact with the inner circumference wall surface 66*a* of the bearing housing main body 66).

In such an embodiment, the lubricant oil that has scattered on the downstream side of the rotational direction due to centrifugal force of the rotational shaft 2 can be prevented from flowing along the outer circumference surface 61*b* or 62*b* of the compressor-side bearing supporting portion 61 or the turbine-side bearing supporting portion 62 to collide with the lubricant oil discharged from the compressor side (the gap 67*b* and the thrust-side oil discharge path 67*e*) of the compressor-side bearing supporting portion 61 or the lubricant oil discharged from the turbine side (the turbine-side oil discharge path 67*d*) of the turbine-side bearing supporting portion 62.

Some embodiments of the present invention are described above. It is to be noted that the present invention is not limited to the embodiments described above, and can be modified in various ways without departing from the object of the present invention.

REFERENCE SIGNS LIST

1 (1A to 1G) Bearing device for turbocharger
2 Rotational shaft
4 Journal bearing device
41 Compressor-side journal bearing
42 Turbine-side journal bearing
43 Compressor-side movement restriction member
44 Turbine-side movement restriction member
5 Compressor wheel
6 Bearing housing
61 Compressor-side bearing supporting portion
61A to 61E Protruding portion
61*a* Inner circumference surface (supporting surface)
61*b* Outer circumference surface
61*g* Groove portion
61*p* Protrusion
62 Turbine-side bearing supporting portion
62A to 62E Protruding portion
63 Oil supply hole
63*a* Inlet-side oil supply hole
63*b* Compressor-side oil supply hole 63c Turbine-side oil supply hole
63d Thrust-side oil supply hole
64 Oil discharge port
65 Discharge oil space
66 Bearing housing main body
66a Inner circumference wall surface
67b Gap
67d Turbine-side oil discharge path
67e Thrust-side oil discharge path
7 Oil deflector
71 Main body portion
71h Center hole
72 Tongue portion
72A Inclined portion
72B Horizontal portion
72h Opening
73 Guide portion
73a Distal end portion
10 Lubricant oil guide member
12 Thrust bearing
13 Retainer
14 Nap ring
15 First thrust collar
16 Second thrust collar
100 Turbocharger
102 Turbine housing
103 Turbine impeller
103a Turbine hub
103b Turbine blade
104 Compressor housing
105 Compressor impeller
105a Compressor hub
105b Compressor blade
111 Exhaust gas outflow port
113 Turbine scroll flow path
115 Intake air inlet
116 Nut
117 Compressor scroll flow path

The invention claimed is:

1. A bearing device for a turbocharger, the bearing device comprising:
a rotational shaft having one end side and another end side provided with a compressor wheel and a turbine wheel, respectively;
a journal bearing device including:
a compressor-side journal bearing rotatably supporting the rotational shaft; and
a turbine-side journal bearing disposed closer to the turbine wheel than the compressor-side journal bearing and rotatably supporting the rotational shaft;
a bearing housing including:
a compressor-side bearing supporting portion having on an inner circumference side thereof a supporting surface supporting the compressor-side journal bearing;
a turbine-side bearing supporting portion having on an inner circumference side thereof a supporting surface supporting the turbine-side journal bearing, the turbine-side bearing supporting portion being disposed to be separated from the compressor-side bearing supporting portion; and
a bearing housing main body inside which the compressor-side bearing supporting portion and the turbine-side bearing supporting portion are supported, the bearing housing main body including:
an oil supply hole through which lubricant oil is supplied to the journal bearing device;
an oil discharge port through which the lubricant oil is discharged to the outside; and
a discharge oil space formed between the compressor-side bearing supporting portion and the turbine-side bearing supporting portion; and
a lubricant oil guide member extending along a circumference direction of the rotational shaft, at an outer circumference side of at least one of the compressor-side bearing supporting portion and the turbine-side bearing supporting portion,
wherein when a virtual line extending vertically downward from a rotational center of the rotational shaft is defined as a reference line in a state where the oil discharge port is orientated downward, the lubricant oil guide member extends from the reference line along the circumference direction toward each of one side and another side of the reference line over a predetermined angle about the rotational center of the rotational shaft,
wherein the lubricant oil guide member includes at least one protruding portion protruding from an outer circumference surface of at least one of the compressor-side bearing supporting portion and the turbine-side bearing supporting portion, and
wherein the at least one protruding portion includes:
a first protruding portion; and
a second protruding portion which is formed at a position further separated from the discharge oil space than the first protruding portion and formed to be separated from the first protruding portion.

2. The bearing device for a turbocharger according to claim 1, wherein the protruding portion is formed, on a side of the discharge oil space, on an end portion of the outer circumference surface of the at least one of the compressor-side bearing supporting portion and the turbine-side bearing supporting portion.

3. The bearing device for a turbocharger according to claim 1, wherein the protruding portion has a side surface which is, on a side opposite to the discharge oil space, inclined toward the discharge oil space from a base end toward a distal end of the side surface.

4. The bearing device for a turbocharger according to claim 1, wherein the protruding portion has a side surface which is, on a side of the discharge oil space, inclined toward the discharge oil space from a base end toward a distal end of the side surface.

5. A turbocharger comprising the bearing device for a turbocharger according to claim 1.

6. A bearing device for a turbocharger, the bearing device comprising:
a rotational shaft having one end side and another end side provided with a compressor wheel and a turbine wheel, respectively;
a journal bearing device including:
a compressor-side journal bearing rotatably supporting the rotational shaft; and
a turbine-side journal bearing disposed closer to the turbine wheel than the compressor-side journal bearing and rotatably supporting the rotational shaft;
a bearing housing including:
a compressor-side bearing supporting portion having on an inner circumference side thereof a supporting surface supporting the compressor-side journal bearing;
a turbine-side bearing supporting portion having an inner circumference side thereof a supporting surface supporting the turbine-side journal bearing, the turbine-side bearing supporting portion being disposed to be separated from the compressor-side bearing supporting portion; and a bearing housing main body inside which the compressor-side bearing supporting portion and the turbine-side bearing supporting portion are supported, the bearing housing main body including:
an oil supply hole through which lubricant oil is supplied to the journal bearing device;
an oil discharge port through which the lubricant oil is discharged to the outside; and
a discharge oil space formed between the compressor-side bearing supporting portion and the turbine-side beating supporting portion; and a lubricant oil guide member extending along a circumference direction of the rotational shaft, at an outer circumference side of at least one of the compressor-side bearing supporting portion and the turbine-side bearing supporting portion, wherein when a virtual line extending vertically downward from a rotational center of the rotational shaft is defined as a reference line in a state where the oil discharge port is orientated downward, the lubricant oil guide member extends from the reference line along the circumference direction toward each of one side and another side of the reference line over a predetermined angle about the rotational center of the rotational shaft, wherein the bearing device for a turbocharger further comprising:
a thrust bearing which is disposed closer to the compressor wheel than the compressor-side journal bearing and supports the rotational shaft in a thrust direction; and
an oil deflector including:
a main body portion which is disposed at a position closer to the compressor wheel than the thrust bearing and faces the thrust bearing;
a tongue portion which extends between the compressor-side bearing supporting portion and the oil discharge port from the main body portion toward the compressor wheel; and
a guide portion that extends upwardly from the tongue portion toward the outer circumference surface of the compressor-side bearing supporting portion,
wherein the lubricant oil guide member includes the guide portion.

7. The bearing device for a turbocharger according to claim 6, wherein the tongue portion includes an opening formed at a position closer to the main body portion than the guide portion.

8. The bearing device for a turbocharger according to claim 6, wherein a groove portion is formed on the outer circumference surface of the compressor-side bearing supporting portion, and a distal end portion of the guide portion is inserted in the groove portion.

9. The bearing device for a turbocharger according to claim 6, wherein a protrusion is formed on the outer circumference surface of the compressor-side bearing supporting portion, and the distal end portion of the guide portion comes into contact with a side surface of the protrusion.

10. A turbocharger comprising the bearing device for a turbocharger according to claim 6.

11. A bearing device for a turbocharger, the bearing device comprising:
a rotational shaft having one end side and another end side provided with a compressor wheel and a turbine wheel respectively;

a journal bearing device including:
a compressor-side journal bearing rotatably supporting the rotational shaft; and
a turbine-side journal bearing disposed closer to the turbine wheel than the compressor-side journal bearing and rotatably supporting the rotational shall;
a bearing housing including:
a compressor-side bearing supporting portion having on an inner circumference side thereof a supporting surface supporting the compressor-side journal bearing;
a turbine-side bearing supporting portion having on an inner circumference side thereof a supporting surface supporting the turbine-side journal bearing, the turbine-side bearing supporting portion being disposed to be separated from the compressor-side bearing supporting portion; and
a bearing housing main body inside which the compressor-side bearing supporting portion and the turbine-side bearing supporting portion are supported, the bearing housing main body including:
an oil supply hole through which lubricant oil is supplied to the journal bearing device;
an oil discharge port through which the lubricant oil is discharged to the outside; and
a discharge oil space formed between the compressor-side bearing supporting portion and the turbine-side bearing supporting portion; and
a lubricant oil guide member extending along a circumference direction of the rotational shaft, at an outer circumference side of at least one of the compressor-side bearing supporting portion and the turbine-side bearing supporting portion,
wherein when a virtual line extending vertically downward from a rotational center of the rotational shaft is defined as a reference line in a state where the oil discharge port is orientated downward, the lubricant oil guide member extends from the reference line along the circumference direction toward each of one side and another side of the reference line over a predetermined angle about the rotational center of the rotational shaft, and
wherein the lubricant oil guide member extends from the reference line in the circumference direction toward each of one side and another side of the reference line over a range of at least 30° about the rotational center of the rotational shaft.

12. The bearing device for a turbocharger according to claim 11,
wherein the lubricant oil guide member is configured of at least one protruding portion protruding from an outer circumference surface of at least one of the compressor-side bearing supporting portion and the turbine-side bearing supporting portion, and
wherein the lubricant oil guide member extends along the circumference direction of the rotational shaft to a position to come into contact with an inner circumference wall surface of the housing main body on at least one of the one side and the other side.

13. The bearing device for a turbocharger according to claim 11, wherein when the one side and the other side of the reference line are defined as an upstream side and a downstream side respectively in a rotational direction of the rotational shaft, the lubricant oil guide member is formed to have a circumference-direction length extending on the other side longer than a circumference-direction length extending on the one side.

14. A turbocharger comprising the bearing device for a turbocharger according to claim 11.

* * * * *